W. F. RICE.
PLANING APPARATUS.
APPLICATION FILED FEB. 21, 1910.
1,038,790.
Patented Sept. 17, 1912.
2 SHEETS—SHEET 2.
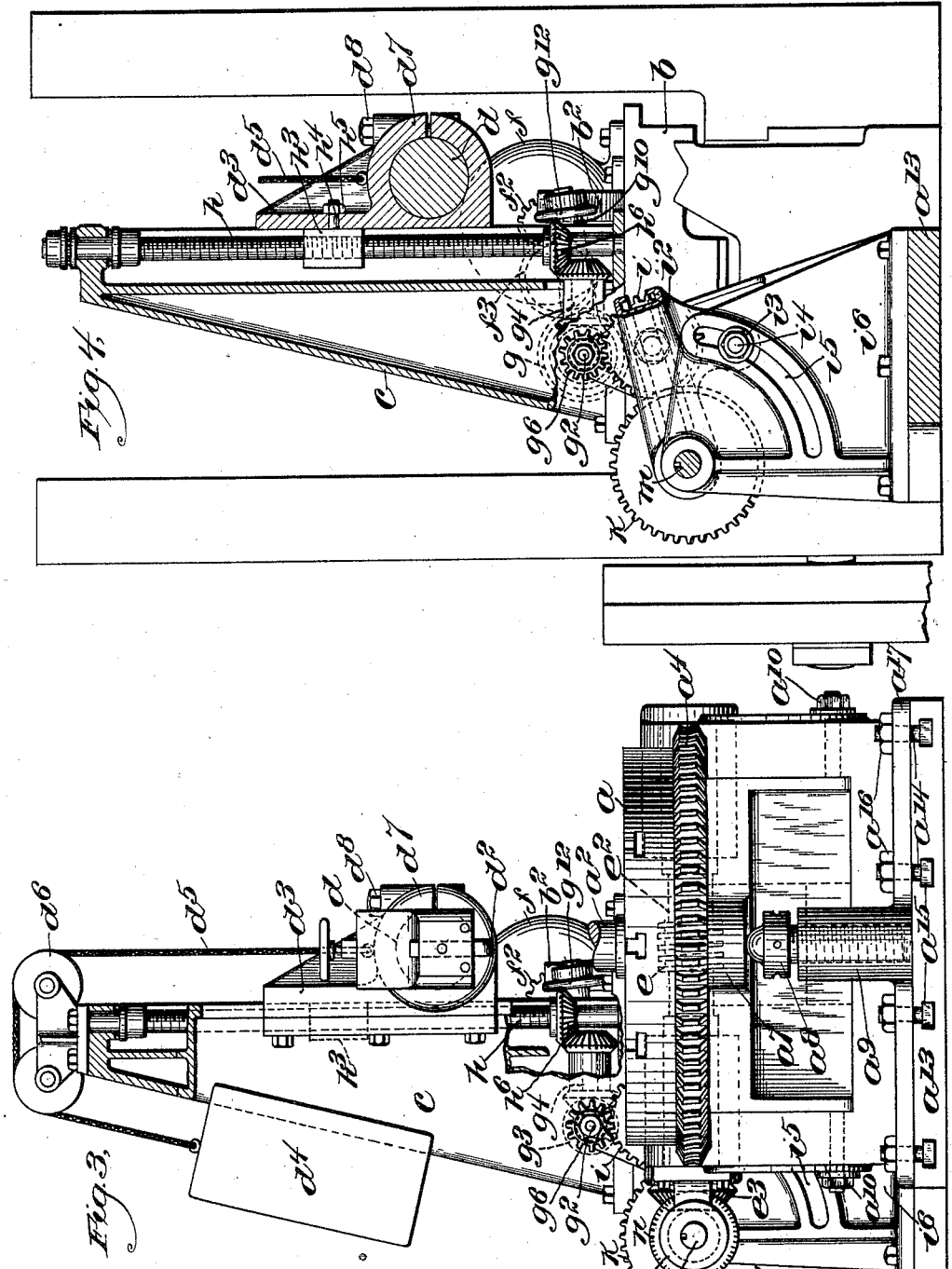

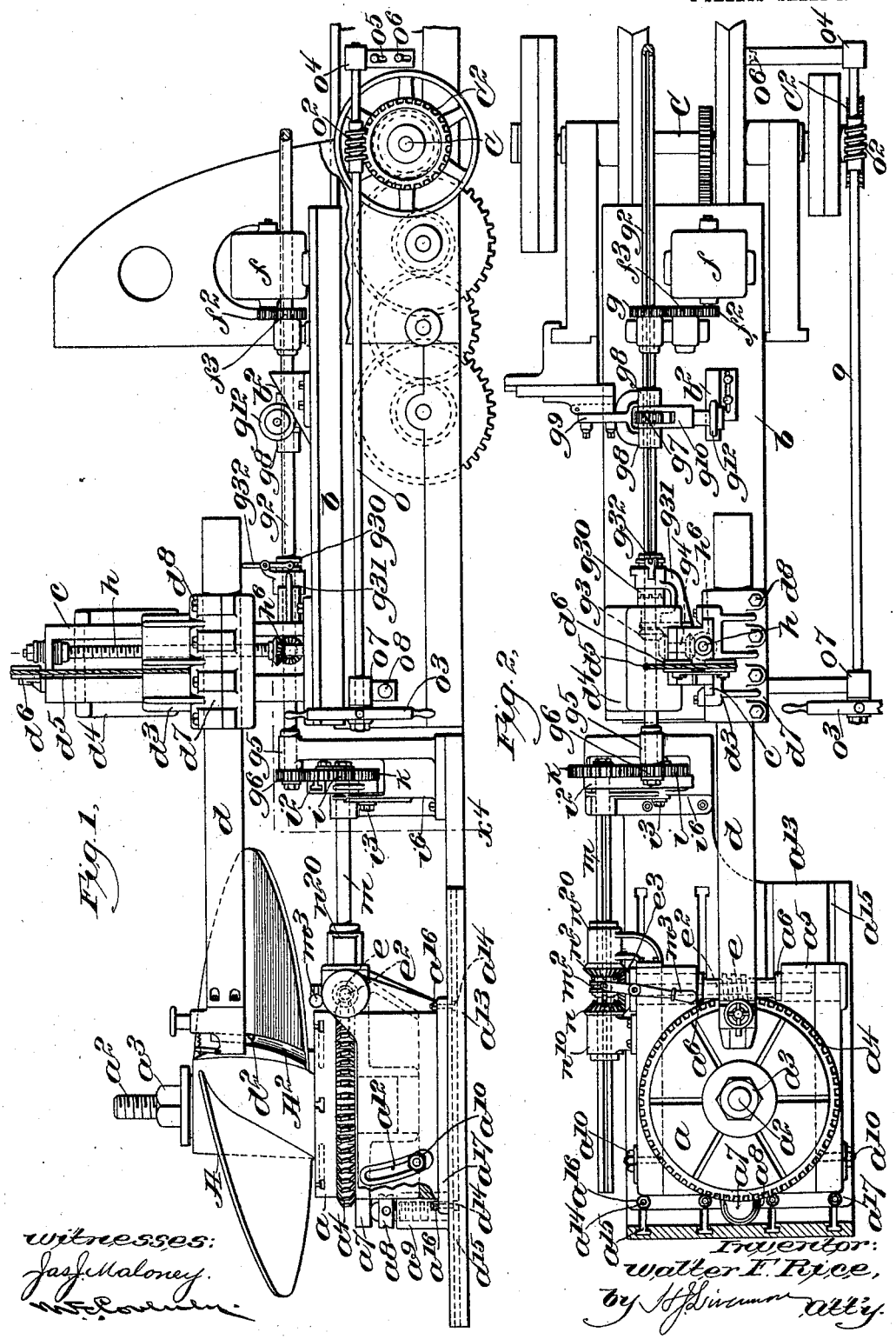

UNITED STATES PATENT OFFICE.

WALTER F. RICE, OF QUINCY, MASSACHUSETTS, ASSIGNOR TO FORE RIVER SHIP BUILDING COMPANY, A CORPORATION OF MASSACHUSETTS.

PLANING APPARATUS.

1,038,790.  Specification of Letters Patent.  Patented Sept. 17, 1912.

Application filed February 21, 1910. Serial No. 545,202.

*To all whom it may concern:*

Be it known that I, WALTER F. RICE, a citizen of the United States, residing in Quincy, in the county of Norfolk and State of Massachusetts, have invented an Improvement in Planing Apparatus, of which the following description, in connection with the accompanying drawings, is a specification, like letters on the drawings representing like parts.

The present invention relates to a planing machine and is embodied in mechanism adapted to be utilized in connection with the table of an ordinary commercial planer for the purpose of adapting the planer for use in operating on screw propellers, or other large pieces of material having helical surfaces, or being otherwise so shaped that the ordinary horizontal reciprocating feed of the commercial planer table will not alone cause the cutting tool to remain in cutting relation to the surface of the article throughout the cutting movement.

The machine is mainly designed for use in planing screw propellers and is shown in conjunction with such a propeller, the main purpose of the invention being to avoid the necessity of using a planer large enough to accommodate a propeller upon the planer table, since the operation can be performed very much more rapidly with a planer of smaller size. For this purpose, the machine embodying the invention consists mainly in an auxiliary support for the material, and mechanism to produce a progressive movement thereof between cuts, combined with mechanism for producing a progressive vertical movement of the cutting tool which is adapted to be mounted on the table of the planer and to be reciprocated thereby, instead of being stationary over the table to operate upon material thereon.

In planing propeller blades in the machine embodying the invention, the cutting tool is arranged to reciprocate in a direction radial to the axis of the propeller, which is mounted on a support provided with adjusting means whereby the blade which is being planed can be so mounted that the surface to be cut is parallel to the line of movement of the cutting tool, the surface of the blade, however, as a whole, being inclined from a horizontal position.

The cutting tool which is arranged to reciprocate, (each cut starting at the hub of the propeller and proceeding to the tip of the blade), is arranged to have a vertical movement downward at the end of each return stroke, so as to follow the incline of the blade from one side thereof to the other. This movement of the cutter is accompanied by a rotary movement of the propeller, these movements being intermittent and taking place on the return stroke of the cutting tool.

The movements above described are step-by-step movements, and in addition thereto, I provide means for continuous movements of both parts, the restoring of the cutting tool to its initial position being made by such a continuous movement, which is relatively rapid; and the continuous movement is also employed in cutting a starting channel which extends along the hub of the propeller at the root of the blade.

In the starting operation, which consists in cutting the channel aforesaid, a cutting tool mounted at a right angle to the cutting head is employed, and during each cutting stroke the cutting head is held stationary except for the continuous downward vertical movement which causes the tool to follow the incline of the blade as the propeller is rotated, also with a continuous movement. After this channel has been cut, the machine is placed in condition for the intermittent feed movement, and the propeller is placed in such a position that the blade to be planed lies parallel with the cutter head, the usual planer mechanism then being set in operation to produce the reciprocation of the table and the cutting tool carried thereby. At the end of each return movement, the cutting tool is moved downward to follow the incline of the propeller blade, and the propeller is rotated to bring the uncut portion in front of the cutting tool, the cutting operation and the progressive movements of the tool and the propeller continuing until that blade is completely planed.

Figure 1 is a side elevation of a machine embodying the invention, the operating mechanism of the planer being mainly omitted for the reason that it forms no part of the present invention, except in so far as the reciprocating planer table is used as the operating member; Fig. 2 is a top plan view of the same; Fig. 3 is a front elevation, on a larger scale, of the machine; and Fig. 4 is a vertical section, on the line $x^4$ of Fig. 1, drawn to the same scale as Fig. 3.

In Fig. 1 the machine is shown as operating upon a propeller A which is mounted on a rotary support $a$, the said support being located in front of the table $b$ of an ordinary planing machine, the said table, in accordance with the invention, being provided with a column $c$ secured thereon, and adapted to hold a tool holder $d$ which is provided with a cutting tool $d^2$ supported therein in the usual way. When the planing machine is in operation, therefore, the table $b$, in reciprocating, instead of carrying the material to be planed under a stationary cutter, causes a reciprocating movement of the tool carrier $d$ which extends beyond the front of the planer so as to act upon the blade of the propeller on the support $a$. In the construction shown, the said support $a$ is provided with a vertical post $a^2$ to receive the hub of the propeller which is firmly clamped to the support $a$ by means of a nut $a^3$. The said support is capable of being rotated for the purpose of moving the propeller A after each cut of the planer tool, to present an uncut surface to said tool for the next operation. The rotary movement is accomplished through the agency of a gear $a^4$ around the said support, said gear engaging with a worm $e$ on a shaft $e^2$ which is adapted to be rotated either intermittingly or continuously, by mechanism which will be described in detail in connection with the description of the mechanism which produces the vertical movement of the tool carrier $d$. Some propellers are constructed with an inclination or "rake" of the blades, and with propellers of this class it is necessary to incline the axis so as to bring the surface of the blade into a plane parallel with the line of movement of the cutting tool. For the purpose of making this adjustment, the carrier $a$ is provided with bearing surfaces $a^5$ which are mounted on trunnions $a^6$ concentric with the rotary shaft $e^2$, so that the support $a$ can be moved from a horizontal to an inclined position without causing the worm and gear to become disengaged from each other. For the purpose of making this adjustment, the support $a$ is provided with a shoulder $a^7$ adapted to be engaged by a column $a^8$ which is shown as screw threaded in a socket $a^9$, so that it can be moved up or down by turning it in the socket, the support $a$ being finally locked in its adjusted position by means of a nut $a^{10}$ on a pin projecting through a slot $a^{12}$ in the frame or casing for the support. After the propeller has been placed on the support and tilted to bring the blade to the right position, the planing operation is started by forming a cut or groove $A^2$ at the root of the blade, the said cut following the periphery of the propeller hub, and affording means for permitting the cutting tool to drop below the surface of the blade, so as to take hold of and cut away the metal in the reciprocating planing operation.

In forming the initial cut $A^2$, the planer table $b$ is not operated, the tool carrier $d$ having in this case no longitudinal movement, the relative movement of the tool and the material being afforded by a continuous rotary movement of the propeller which continues through a distance equal to the width of the blade at the root thereof. It is to be understood that the cutting tool, in this preliminary operation, is set to cut in a direction substantially transverse to its usual operation, or, if need be, a special tool may be employed for this purpose.

In order to cause the necessary relative movements of the tool and the material to produce the pitch for which the propeller is designed, the tool carrier $d$ is caused to travel downward with a continuous movement duly proportioned to the rotary movement of the propeller, the movement of both the propeller and the tool carrier being produced through the agency of a reversible motor $f$, herein shown as an electro-motor mounted on the table $b$ of the planer. The driving shaft of this electro-motor is provided with a pinion $f^2$ which operates through a gear $f^3$ on a gear $g$ which is splined on a shaft $g^2$, the said shaft being longitudinally stationary with relation to the planer table $b$.

The tool holder $d$ is mounted in a vertically movable carrier $d^3$ which is arranged to travel up and down in guides on the column $c$, the weight of the tool, tool holder and carrier being counterbalanced by means of a weight $d^4$ which is connected with the carrier by means of a flexible cord or belt $d^5$ running over pulleys $d^6$, as best shown in Fig. 3.

The vertical movement of the carrier $d^3$ is produced through the agency of a vertical threaded shaft $h$ which extends upward within the vertical guide $c$ for the tool carrier, and engages an internal thread in a nut $h^3$ secured to the carrier $d^3$, as shown in Fig. 4, by a projection $h^4$ and smaller nut $h^5$, the said shaft being arranged to be rotated by the longitudinal shaft $g^2$. In the construction shown, the said shaft $g^2$ has a bevel gear $g^3$ sleeved thereon, and in engagement with a corresponding bevel gear on a short connecting shaft $g^4$, there being a second bevel gear on said shaft $g^4$ which meshes with a bevel gear $h^6$ on the vertical rotating shaft $h$. As the motor travels, therefore, in one direction or the other, the tool may be lifted or lowered, the operating movement being, in the arrangement shown, the movement downward.

The same actuating mechanism is arranged to produce the rotation of the propeller support $a$, the shaft $g^2$, which is supported at its outer end in a bearing $g^5$ located in front of the planer, being provided with a spur gear $g^6$ which meshes through an intermediate gear $i$ with a spur gear $k$ which operates a shaft $m$. This shaft $m$ is provided with a splined clutch member $m^2$ which rotates with the shaft, and is adapted to be shifted by means of a handle $m^3$ into engagement with one or the other of two bevel gears $n$ and $n^2$ mounted in bearings $n^{10}$ and $n^{20}$, both of these bevel gears being in mesh with a bevel gear $e^3$ on the shaft $e^2$ which carries the worm $e$. The reason for providing the device with the clutch $m^2$ is to accommodate the machine for operation in connection with propellers in which the blades incline in opposite directions, i. e., right hand or left hand screws. As best shown in Figs. 3 and 4, the intermediate gear $i$ is mounted in a swinging arm $i^2$ which has a pivotal support concentric with the shaft $m$. The gears $g^6$ and $k$, therefore, can be removed and exchanged for other gears of different sizes, so that the movement of the propeller can be proportioned to the vertical movement of the tool to accommodate propellers differing in pitch. When these gears are changed, the arm $i^2$ can be swung on its bearing to the proper position to allow the gear $i$ to intermesh with the gears in use, and can be locked by a nut $i^3$ on a pin $i^4$ which extends through a curved slot $i^5$ in the standard $i^6$.

In forming the channel $A^2$, the planer table is not moved during the actual cutting operation, the cutting tool remaining stationary except for its vertical movement, while the material is caused to travel relatively to the tool.

The motor $f$, traveling continuously during this part of the operation, causes all the necessary movements, and the mechanism for operating the planer table is not started. It is desirable, however, to form a channel wider than can be formed by a single cutting operation, and it becomes necessary, therefore, to repeat the operation a number of times. Prior to each cutting operation, the tool must be moved laterally with relation to the groove, i. e., by a longitudinal movement of the tool carrier; and this may be accomplished by turning the pulley which normally operates the planer table or equivalent reciprocating carrier for the tool. In order that the movement may be conveniently under the control of the operative who has charge of the machine, the shaft C, which normally causes the operative reciprocating movement of the tool carrier is shown as provided with a gear $C^2$ meshing with a worm $o^2$ on a shaft $o$ extending to a point near the front of the planer table and having a hand-wheel $o^3$ whereby it may be easily manipulated. At the end of each cut, the motor $f$ is reversed, thus causing the material support to rotate in the reverse direction, and the tool carrier to rise correspondingly, until both are at the starting position. The planer table, or equivalent reciprocating tool-carrier, is then moved longitudinally in any suitable way, to position the tool for the next operation; for example, in the construction shown, by rotating the hand-wheel $o^3$. These operations may be repeated as often as is necessary, it being obvious, in fact, that the entire blade may be machined in this way, if it is found to be expedient. After this part of the operation has been finished, it is necessary to disconnect the worm $o^2$ from the gear $C^2$, in order to admit of the normal operation of the planer; and for this purpose, the bearing $o^4$ at one end of the shaft $o$, is shown as provided with slots $o^5$, through which extend supporting projections $o^6$. These projections are shown as bolts or machine screws threaded in the frame of the machine, so that they can be tightened to act as clamps to support the bearing $o^4$ after said bearing has been lifted to disengage the worm from the gear. To admit of the tilting movement of the shaft $o$, the bearing member $o^7$, at the other end thereof, is shown as pivotally supported on a stud $o^8$. After the channel $A^2$ has been cut as described to the desired width, and the tool $d^2$ is in starting position, i. e., at the highest point of the propeller blade, the motor $f$ is stopped and the worm $o^2$ is disconnected from the gear $c^2$, and the planer, or equivalent tool carrier, is started, thus producing the longitudinal movement of the tool from the hub of the propeller toward the tip of the blade to cut a chip radially from the surface of said blade. During the planing operation thus carried on, it is necessary to produce the rotary movement of the propeller and the vertical movement of the tool carrier intermittingly, the movements taking place at the end of the return stroke of the tool as to bring an uncut portion of the blade into the path of the tool. For this purpose, the shaft $g^2$ is provided with a ratchet $g^7$ which is keyed to the said shaft between bearings $g^8$ formed in a bracket $g^9$ secured to a stationary part of the planer frame so that the position of the ratchet $g^7$ is not changed by the reciprocating movement of the table. The said ratchet is acted upon by a pawl mounted on an arm $g^{10}$ provided with a cam roller $g^{12}$ which coöperates with an inclined surface or cam $b^2$ secured on the planer table $b$, so that at the end of the forward movement of the planer table which carries the tool $d^2$ back to its operative position preparatory to the next cutting operation, the arm $g^{10}$ will be rocked, causing a pawl to move the ratchet the desired distance. After the planer has been started, therefore, the tool will be reciprocated, making at each working stroke a cut starting at the hub of the propeller and extending radially to the tip thereof, the propeller being turned and the tool correspondingly lowered at the end of the return stroke of the tool. After the planing of the blade has been finished, the tool carrier can be rapidly raised, and the propeller rotated to bring the next blade into position, by operating the motor after lifting the feed pawl out of engagement with the ratchet.

In order to bring the next blade of the propeller into the proper position with relation to the tool, it is usually necessary to cause an independent movement of the work-support, or the propeller thereon; and in order that this may be easily accomplished, the machine is provided with means for easily disconnecting the tool actuating mechanism from the motor, so that the latter can be operated to turn the work-support without performing any other function. For this purpose, the gear $g^3$, which has been described as sleeved on the shaft $g^2$, is adapted to be engaged by a clutch member $g^{30}$, splined on the shaft and bearing in an arm $g^{31}$ in which it is longitudinally movable, as by a pivoted handle $g^{32}$. When this clutch member is disconnected from the gear $g^3$, it is obvious that the said gear will remain stationary, and any desired movement of the work support can be caused by the motor without correspondingly moving the tool carrier.

For purposes of adjustment, to accommodate the apparatus for use with propellers of different sizes, the frame for the work-support $a$ is shown as mounted on a sub-base $a^{13}$, to which it is clamped by means of bolts $a^{14}$ lying in undercut slots $a^{15}$ extending lengthwise of the support, said bolts having clamping nuts $a^{16}$ bearing on the upper face of a flange $a^{17}$ at the bottom of the work-support frame. The longitudinal adjustment of the work-support is made without interfering with the actuating mechanism therefor since the gears $n$ and $n^2$, as previously described, are sleeved on the shaft $m$, while the clutch member $m^2$ is splined thereon. The entire system of gears, therefore, will slide along the shaft, and will remain capable of operation in any position thereon. The tool holder $d$ is also capable of longitudinal adjustment in the carrier $d^3$, being shown as held in a split sleeve $d^7$ provided with clamping screws $d^8$, by which it is held in its adjusted position.

It is obvious that the apparatus may be provided with any suitable means for reciprocating the cutting tool, but the ordinary planer is provided with mechanism for producing the mechanical movements which are required, and can be easily and quickly equipped with the attachments which adapt it for use in the planing of propellers. Furthermore, these attachments do not interfere with the ordinary use of the planer, as they do not involve any change in the operative mechanism, and can easily be removed to clear the planer table if it is desired to place material in the usual way. For this reason, it is not necessary or desirable to build a complete apparatus for the purpose, since the necessary attachments may be applied to a small and rapidly operating planer. It should be stated, moreover, that the relative movements of the tool-carrier and the work-support which are provided for in accordance with the invention, are capable of use in carrying out operations other than planing, since any tool or appliance, adapted for the purpose which may be required, can be attached to the tool carrier.

What I claim is:

1. A planing apparatus comprising a reciprocating tool carrier; a movable support for the material to be planed; means for automatically producing intermittent movements of the tool carrier in a direction other than the direction of reciprocating movement thereof; said means operating at the end of the reciprocating movement; and connecting mechanism whereby said movable support is moved a distance proportional to that movement of the tool-carrier which is independent of its reciprocating movement.

2. The combination with a horizontally reciprocating tool-carrier; of a vertically movable holder for the tool; means for automatically producing an intermittent vertical movement of said holder, said means operating at the end of each complete reciprocation of the tool carrier; a rotatable support for the material to be planed; and means for causing an intermittent rotating movement of said support coincident with and having a definite relation to the vertical movement of the tool holder.

3. The combination with a horizontally reciprocating and vertically movable tool; of a normally horizontal rotating support for the material to be operated upon by said tool; means for producing a transverse movement of the tool at the end of its reciprocating movement; means coöperating therewith for correspondingly rotating the support; and means for inclining said support from its normally horizontal position, without disconnecting it from its rotating means.

4. The combination with a reciprocating tool; of means for reciprocating said tool; a traveling support for material to be operated on by said tool; actuating mechanism connected with said support to cause a movement thereof at the end of a complete reciprocation of the tool; and means for inclining the surface of said support without disconnecting it from its actuating mechanism, whereby the material on the support can be placed in the necessary position relative to the cutting tool.

5. The combination with a reciprocating tool; of a rotary support for material to be operated upon thereby; a gear connected and coaxial with said support; an actuating shaft; a worm on said shaft meshing with said gear; trunnions coaxial with said shaft; bearing members for said support mounted on said trunnions, whereby the axis of said support can be inclined without interfering with the operation thereof; and connecting mechanism whereby the actuating shaft for the rotary support is adapted to operate intermittingly, one of the intermittent operations occurring at the end of each complete reciprocation of the tool.

6. In an apparatus for planing screw-propellers, the combination with a horizontally reciprocating tool; of means for causing a vertical movement thereof; a rotary support provided with a spindle in line with its axis to receive the propeller hub, said spindle being provided with means for clamping the propeller on the support, and the surface of said support being normally in a horizontal plane; actuating mechanism to cause the rotation of the support; means for inclining said support from its horizontal plane without disconnecting it from its actuating mechanism; and connecting mechanism whereby the means for causing the vertical movement of the tool and the actuating mechanism for causing the rotary movement of the support operate at the same time after each complete reciprocation of the tool.

7. The combination with a reciprocating tool-carrier; of a holder therefor adapted to travel in a direction transverse to the direction of reciprocation; a rotatable threaded shaft to produce such transverse movement of said holder; a ratchet and pawl to cause the rotation of said shaft; a cam traveling with the tool carrier to act on said pawl; a rotary material support; and a shaft operated by said ratchet and pawl and geared to said rotary material support; whereby the transverse movement of the holder and the rotary movement of the support are produced in unison in response to the reciprocating movement of the tool carrier tween said longitudinally stationary shaft and said countershaft; means for rotating said longitudinally stationary shaft continuously; and other means for rotating said shaft intermittingly.

9. The combination with a reciprocating tool; of a rotary support for the material; a shaft geared to said support to cause the rotation thereof; a driving shaft having two gears bearing thereon and adapted when rotated therewith to drive respectively in opposite directions the shaft which is geared to the support; a clutch member rotatable with said driving shaft and adapted to be clutched to either of said gears; and means for intermittingly rotating said driving shaft.

10. The combination with a reciprocating tool; of a rotatable shaft adapted to cause a movement of said tool in a direction transverse to its path of reciprocation; a support for the material to be acted on by the tool; means for causing said support to be moved at the end of each reciprocation of the tool, so as to bring an uncut portion of the material into the path of movement of the tool; a second rotatable shaft to cause the said movement of the support; and interchangeable connecting gears between said rotatable shafts.

11. The combination with a longitudinally movable tool carrier; of a rotatable shaft to produce a secondary movement thereof; a motor the driving member of which is splined on said shaft, said motor being longitudinally movable with said tool carrier; a ratchet fast on said shaft; a pawl to operate said ratchet; and a cam traveling with said tool carrier to operate said pawl.

12. The combination with a tool; of a traveling work-support; a motor operating on said tool and said work-support to maintain the tool in operative engagement with the material on said support during the relative movement of the tool and support which results in a machining operation; and means for disconnecting said motor from either of the parts operated thereby, whereby one of said parts can be operated independently of the other.

13. The combination with a planer; of a tool-carrier mounted on the planer table; a tool holder longitudinally adjustable with relation to said carrier and projecting befor moving said table when the planer is not in operation; a rotatable work-support separate from the planer-table; a tool carried by the planer-table and projecting over the work-support to coöperate with the material thereon; and means for disconnecting the manually operated device from the planer-table actuating mechanism when the planer-table is to be operated to reciprocate the tool.

15. The combination with a planer-table provided with a tool-carrier; of a tool-holder longitudinally adjustable therein; a work-support separate from the planer table and mounted to rotate in a tilting frame; a sub-base for said frame; means for varying the position of said frame in said sub-base to adjust the position of the work-support relative to the planer-table; means for causing a vertical movement of the tool-carrier; and connecting mechanism between the planer table and the work support for correspondingly rotating the work-support, said mechanism being arranged so that the adjustments can be made without interfering with the operation thereof.

In testimony whereof, I have signed my name to this specification in the presence of two subscribing witnesses.

WALTER F. RICE.

Witnesses:
W. S. WELLS,
ETHEL RANDALL.

Copies of this patent may be obtained for five cents each, by addressing the "Commissioner of Patents, Washington, D. C."